United States Patent
Ishiyama et al.

(10) Patent No.: US 7,528,867 B2
(45) Date of Patent: May 5, 2009

(54) DIGITAL CAMERA AND IMAGING SYSTEM FOR RECORDING IMAGING INFORMATION IN ASSOCIATION WITH IMAGE DATA

(75) Inventors: Eiji Ishiyama, Asaka (JP); Hiroshi Tanaka, Asaka (JP)

(73) Assignee: Fujifilm Corporation, Minato-ku, Tokyo (JP)

( * ) Notice: Subject to any disclaimer, the term of this patent is extended or adjusted under 35 U.S.C. 154(b) by 742 days.

(21) Appl. No.: 10/452,140

(22) Filed: Jun. 3, 2003

(65) Prior Publication Data

US 2004/0021777 A1 Feb. 5, 2004

(30) Foreign Application Priority Data

Jun. 4, 2002 (JP) ............ P. 2002-163039

(51) Int. Cl.
H04N 5/232 (2006.01)
H04N 5/76 (2006.01)

(52) U.S. Cl. ............ 348/231.3; 348/211.1; 348/211.2

(58) Field of Classification Search . 348/211.99–211.4, 348/211.2, 211.1, 552, 231.2, 207.1, 207.2, 348/207.11
See application file for complete search history.

(56) References Cited

U.S. PATENT DOCUMENTS

| | | | | |
|---|---|---|---|---|
| 5,797,809 A * | 8/1998 | Hyuga | ............ | 473/407 |
| 6,300,976 B1 * | 10/2001 | Fukuoka | ............ | 348/231.99 |
| 6,396,537 B1 * | 5/2002 | Squilla et al. | ............ | 348/239 |
| 6,535,243 B1 * | 3/2003 | Tullis | ............ | 348/207.1 |
| 6,741,864 B2 * | 5/2004 | Wilcock et al. | ............ | 455/456.1 |
| 6,809,759 B1 * | 10/2004 | Chiang | ............ | 348/211.2 |
| 6,954,280 B1 * | 10/2005 | Kaibara | ............ | 358/1.15 |
| 6,970,189 B1 * | 11/2005 | Bernstein et al. | ............ | 348/211.2 |
| 7,002,625 B2 * | 2/2006 | Takahashi | ............ | 348/231.2 |
| 7,027,084 B1 * | 4/2006 | Watanabe | ............ | 348/211.2 |
| 7,075,568 B2 * | 7/2006 | Aizawa | ............ | 348/211.99 |
| 7,098,943 B2 * | 8/2006 | Shibutani | ............ | 348/211.1 |
| 7,111,317 B1 * | 9/2006 | McIntyre et al. | ............ | 725/105 |
| 7,173,651 B1 * | 2/2007 | Knowles | ............ | 348/207.1 |
| 7,236,185 B2 * | 6/2007 | Terada et al. | ............ | 348/207.11 |
| 7,248,285 B2 * | 7/2007 | Needham | ............ | 348/207.1 |
| 7,249,317 B1 * | 7/2007 | Nakagawa et al. | ............ | 715/209 |
| 7,321,387 B2 * | 1/2008 | Novais et al. | ............ | 348/211.11 |
| 7,339,610 B2 * | 3/2008 | Kusaka | ............ | 348/207.1 |
| 2004/0145660 A1 * | 7/2004 | Kusaka | ............ | 348/211.2 |

FOREIGN PATENT DOCUMENTS

JP 2001-24982 1/2001

* cited by examiner

*Primary Examiner*—David L Ometz
*Assistant Examiner*—Pritham Prabhakher
(74) *Attorney, Agent, or Firm*—McGinn IP Law Group, PLLC (57) ABSTRACT

A digital camera has an imaging information record mode where imaging information including information on a target to be picked up is recorded in association with image data as well as a regular shooting mode. When imaging information to be recorded is determined, the details of the information is sent to external apparatus via a radio interface and an antenna and corrected by the user interface of the external apparatus. The corrected image is input via the antenna again and updated. The updated image is recorded as property information in an image file including the shot image. According to the digital camera, it is possible to readily correct and add imaging information recorded as property information of image data.

21 Claims, 7 Drawing Sheets

| ITEM | VALUE | DESTINATION TAG NAME | | FORMAT TYPE |
|---|---|---|---|---|
| SCENE NAME | FOUNDATION CONCRETE A | Exif | FileDescription | CHARACTER STRING |
| OUTSIDE AIR TEMPERATURE | | MakerNote | 001 | 1-BYTE INTEGER |
| IMAGE DATE/TIME | | | | |
| IMAGE FILE NAME | | | | |

| ITEM | VALUE | DESTINATION TAG NAME | | FORMAT TYPE |
|---|---|---|---|---|
| SCENE NAME | FOUNDATION CONCRETE A | Exif | FileDescription | CHARACTER STRING |
| OUTSIDE AIR TEMPERATURE | | MakerNote | 001 | 1-BYTE INTEGER |
| IMAGE DATE/TIME | | | | |
| IMAGE FILE NAME | | | | |

SCENE NAME, FOUNDATION CONCRETE A, Exif, FileDescription, CHARACTER STRING
OUTSIDE AIR TEMPERATURE,,MakerNote, 001,1-BYTE INTEGER
IMAGING DATE/TIME,,,,
IMAGE FILE NAME,,,, SCENE NAME, FOUNDATION CONCRETE B, Exif, FileDescription, CHARACTER STRING
OUTSIDE AIR TEMPERATURE, MakerNote, 001,1-BYTE INTEGER
IMAGING DATE/TIME,,,,
IMAGE FILE NAME,,,,

IMAGING INFORMATION
SCENE NAME: FOUNDATION
             CONCRETE B
OUTSIDE AIR TEMPERATURE:
LATITUDE: N35°48'26"82
LONGITUDE: E139°34'50"47

END

SCENE NAME, FOUNDATION CONCRETE A, Exif, FileDescription, CHARACTER STRING
OUTSIDE AIR TEMPERATURE,,MakerNote, 001,1-BYTE INTEGER
IMAGING DATE/TIME,,,,
IMAGE FILE NAME,,,, SCENE NAME, FOUNDATION CONCRETE B, Exif, FileDescription, CHARACTER STRING
OUTSIDE AIR TEMPERATURE,32,MakerNote, 001,1-BYTE INTEGER
IMAGING DATE/TIME,,,,
IMAGE FILE NAME,,,,
LATITUDE, N35482682, GPS, GPSLatitude, RATIONAL
LONGITUDE, E139345047, GPS, GPSLongitude, RATIONAL

| TAG INFORMATION (IMAGE ACCOMPANYING INFORMATION) | | |
|---|---|---|
| | IMAGING DATE/TIME: 12:31, AUGUST 16, 2001 | |
| | IMAGING MODE: NORMAL | |
| | WHITE BALANCE: AUTO | |
| Exif | FOCUS: MANUAL | |
| | STROBE: OFF | |
| | ⋮ | |
| | SCENE NAME: FOUNDATION CONCRETE B | |
| MakerNote | OUTSIDE AIR TEMPERATURE: 32 | |
| GPS | LATITUDE: N35°48'26"82 | |

⋮

THUMB NAIL IMAGE (160 x 120)

MAIN IMAGE (XGA: 1024 x 764)

DIGITAL CAMERA AND IMAGING SYSTEM FOR RECORDING IMAGING INFORMATION IN ASSOCIATION WITH IMAGE DATA

BACKGROUND OF THE INVENTION

1. Field of the Invention

The present invention relates to a digital camera which records imaging information including information on a target to be picked up in association with image data under an imaging information record mode and a imaging system which uses such a digital camera.

2. Description of the Related Art

In the case of photographing and recording a working situation in a construction site or a manufacturing factory, data concerning an image to be picked up such as a scene is predetermined. A user picks up images on the basis of such imaging guide data. A shot image is managed together with imaging conditions such as imaging date/time information, diaphragm, and shutter speed as well as data on imaging scene.

A digital camera usually records data of an image in an image file form including image data property information. The property information can be recorded including imaging conditions such as imaging date/time information, diaphragm, and shutter speed as well as user's memo in picking up. Thus, using a digital camera for recording an image of a working situation simplifies recording and management of an image.

A technology which uses a digital camera for recording an image of a working situation is described in "A digital camera system for recording of work" in the JP-A-2001-24982. This camera system generates information on individual images to be picked up (imaging information including target to be imaged, scenes, and bibliographic information on a target to be imaged) on a computer for managing an image database, sends to and stores into a digital camera the generated imaging information, records the image data in association with the imaging information, and sends to the computer the image data and the imaging information for management. The imaging information is generated about images to be picked up on the very day. Thus, it is possible to prevent omission of picking up images by managing the information to discriminate between the imaging information after picking up and the imaging information before picking up.

Imaging information sent to and stored into a digital camera can be displayed and checked on the display of the digital camera per image to be shot. The imaging information can be corrected or additional items can be input by using input means of the digital camera. However, the interface of a digital camera is simple and not ready for complicated input operations such as a correction to the imaging information. In order to record environmental parameters such as the longitude and latitude information and the outside air temperature of an imaging site, a digital camera must be equipped with a GPS unit and various sensors. This approach, however, generates additional costs and is not favorable.

SUMMARY OF THE INVENTION

The object of the invention is to provide a digital camera that can easily correct and add imaging information recorded as property information of image data and an imaging system which uses such a digital camera.

The invention provides a digital camera, which records imaging information including information on a target to be picked up in association with image data under an imaging information record mode, has an imaging information storage section for storing the imaging information, a communications section for communicating with an external portable terminal via wired or wireless communications, an imaging controller for performing imaging control including imaging control in the imaging information record mode, and an imaging information management section for managing the imaging information, wherein the imaging information management section, in the imaging information record mode, sends imaging information selected from the imaging information stored in the imaging information storage section to the external portable terminal via the communications section and updates the imaging information in the imaging information storage section when receiving the imaging information from the external portable terminal, and the imaging controller, in the imaging information record mode, reads the selected imaging information from the imaging information storage section and stores the imaging information in association with the image data in recording image data.

The imaging information is recorded as property information of an image file including the image data.

The invention provides a shooting having a digital camera, which records imaging information including information on a target to be picked up in association with image data under an imaging information record mode, and a portable terminal, wherein said digital camera including: an imaging information storage section for storing said imaging information; a communications section for communicating with an external portable terminal via wired or wireless communications; an imaging controller for performing imaging control including imaging control in said imaging information record mode; and an imaging information management section for managing said imaging information, wherein said imaging information management section, in said imaging information record mode, sends imaging information selected from the imaging information stored in said imaging information storage section to said external portable terminal via said communications section and updates said imaging information in said imaging information storage section when receiving said imaging information from said external portable terminal, and said imaging controller, in said imaging information record mode, reads said selected imaging information from said imaging information storage section and stores the imaging information in association with said image data in recording image data, and the portable terminal, which is connected via said communications section, including a display section, an operating section and an imaging information modification controller, wherein said imaging information modification controller displays the imaging information received from said digital camera onto said display section and sends said imaging information which is undergone a correction to said digital camera, said correction includes a correction implemented by way of operation on said operating section.

The imaging information is recorded as property information of an image file including said image data.

DETAILED DESCRIPTION OF THE PREFERRED EMBODIMENTS

Figure 1:
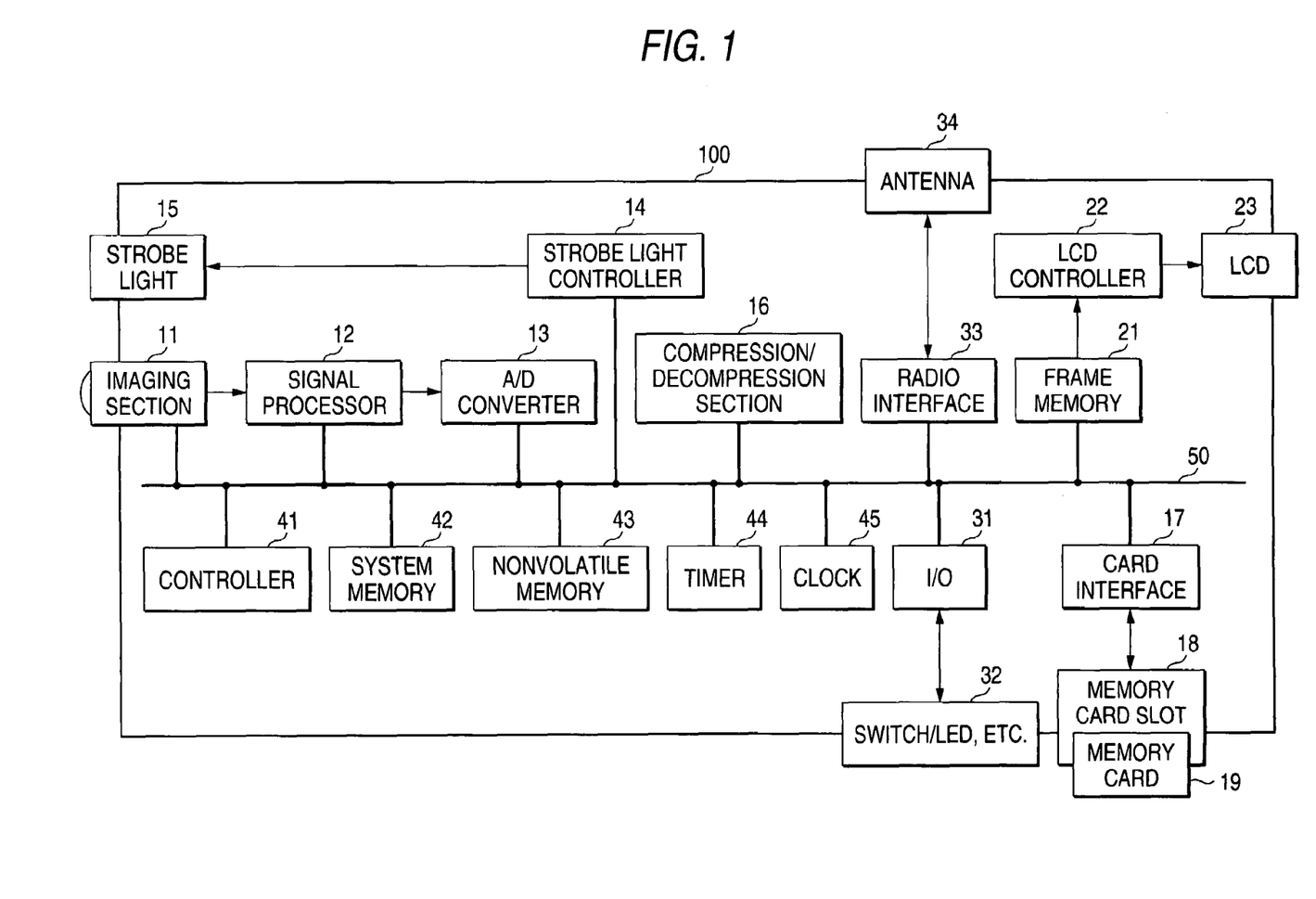
FIG. 1 shows a general configuration of a digital camera according to an embodiment of the invention.

An embodiment of the invention will be described referring to drawings. FIG. 1 shows a general configuration of a digital camera according to an embodiment of the invention.

A digital camera 100 shown in FIG. 1 acquires digital image signal by way of an image pickup section 11, a signal processor 12, and an A/D converter 13. A strobe light controller 14 causes a strobe light 15 to flash for stroboscopic photography. The digital image signal undergoes compression process by a compression/decompression section 16 and recorded onto a memory card 19 inserted in a memory card slot 18 via a card interface 17. Recording onto the memory card 19 is made per image file including compressed image data and property information.

To display an image which is based on image data recorded on the memory card 19, the compression/decompression section 16 performs decompression of image data read from the memory card 19 and writes the data into a frame memory 21. An LCD (liquid crystal display) controller 22 displays an image associated with the data in the frame memory 21. The LCD 23 can display an image which is based on a digital image signal acquired from the A/D converter 13 as well as an image which is based on the image data on the memory card 19. The LCD 23 is also used to display various states of the digital camera 100 and an operation menu.

An input/output interface 31, which is connected to a switch/LED 32, inputs various operation signal from switches of the digital camera 100 and outputs a signal for an LED to display states of the digital camera 100. A radio interface 33 performs short-range radio communications to external apparatus via an antenna 34. The short-range radio communications include Bluetooth, infrared data communications of the IrDA system and wireless LAN. Communications with external apparatus may use wired communications means.

A controller 41 controls the operation of the entire digital camera 100. A processor operating on a predetermined program mainly constitutes the controller 41. The controller 41 records and manages imaging information described later as well as controls imaging operation, image recording operation, and image display operation. A system memory 42 and a nonvolatile memory 43 store data and a program used for various process in the digital camera 100 and serves as a working memory. A timer 44 and a clock 45 are used to control imaging timing and to record/manage imaging information. A system bus 50 transfers data between each components of the digital camera 100.

Regular imaging operation, image recording operation, and image display operation of the digital camera 100 having the aforementioned components are not described because they are basically the same as those in the related art.

The digital camera 100 has an imaging information recording mode that imaging information including information on a target to be picked up is recorded in association with image data as well as a regular imaging mode. Imaging information items are a scene name to identify a target to be picked up, outside air temperature at a imaging site, imaging date/time, image file name, and longitude and latitude information of a imaging site, which are respectively set as required in response to a user's request. The imaging information is generated on a personal computer and previously stored into the digital camera 100. Input to the digital camera 100 may use the memory card 19 or short-range radio communications. In the case the memory card 19 is used to input imaging information, the memory card is also used to record an image file.

Figure 2:
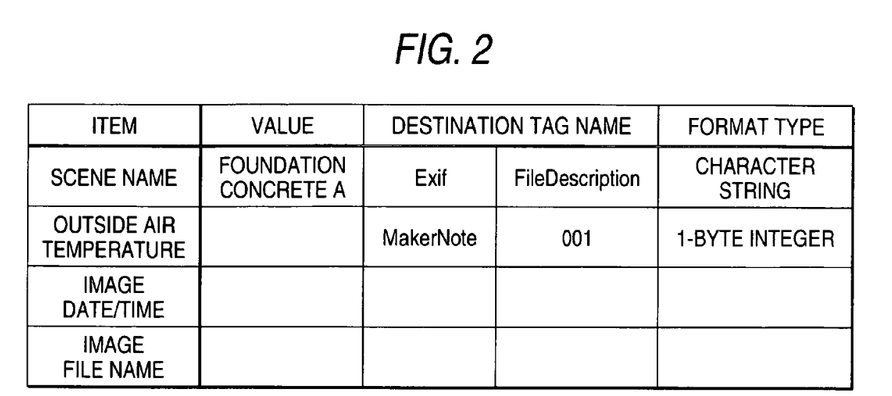
FIG. 2 shows an example of a imaging information item list.
Figure 3:
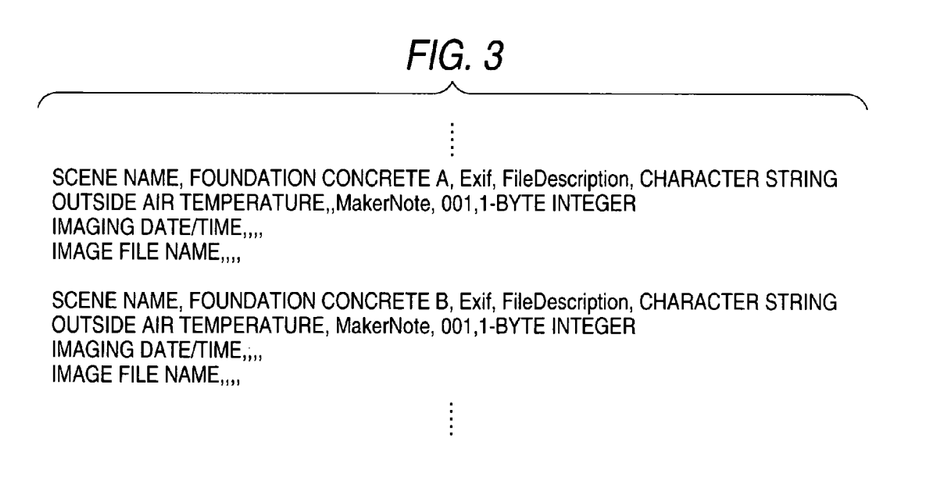
FIG. 3 shows part of a imaging information list file to be input.

FIG. 2 shows an example of an imaging information item list. Value of an item, destination tag name in an image file and its record format type are set in each item. The example of FIG. 2 shows that value "Foundation concrete A" and other data are input in the item "scene name". Outside air temperature information, imaging date/time, and image file name are blank because such values are automatically generated by the digital camera 100 or a user manually inputs when an image is picked up. The imaging information is generated per image to be picked up and is input as a imaging information list file to the digital camera 100. FIG. 3 shows part of the imaging information list file to be input.

Figure 4:
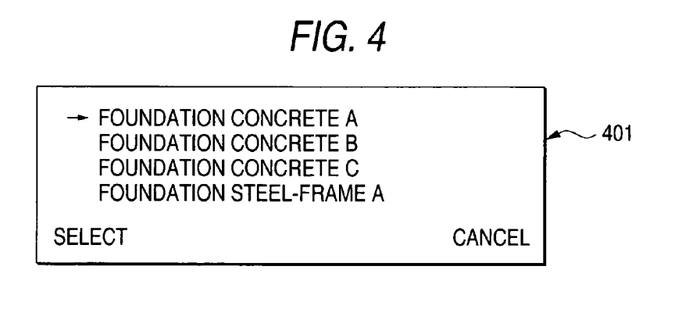
FIG. 4 shows an example of a screen to select imaging information.

The imaging information input to and stored into the digital camera 100 is referred in imaging and is used for identifying a target to be picked up. When the digital camera 100 is set to the imaging information record mode by way of operation of a switch, the controller 41 refers to the stored imaging information and displays imaging targets on the LCD 23 as shown in FIG. 4 to prompt the user to select one. Selection is made by moving a cursor 401. When selection is made, the details of the selected imaging information is recorded onto an image file including the image as property information in recording of the image. The imaging information is preferably generated as file in an order to identify an imaging target in accordance with the imaging order. Imaging information on a picked up image is preferably not displayed. The initial position of a cursor after mode switchover preferably points to an imaging target which is picked up at first.

Imaging information can be modified by way of operation of external apparatus. Modification of imaging information is implemented by sending a selected imaging information to external apparatus such as a PDA via radio communications, receiving the modified imaging information, and updating the stored imaging information to the received imaging information. Modification of imaging information includes input of a value into an item to which is not yet input, a correction of an input value, addition of a new item, as well as generation of a new item.

Figure 5:
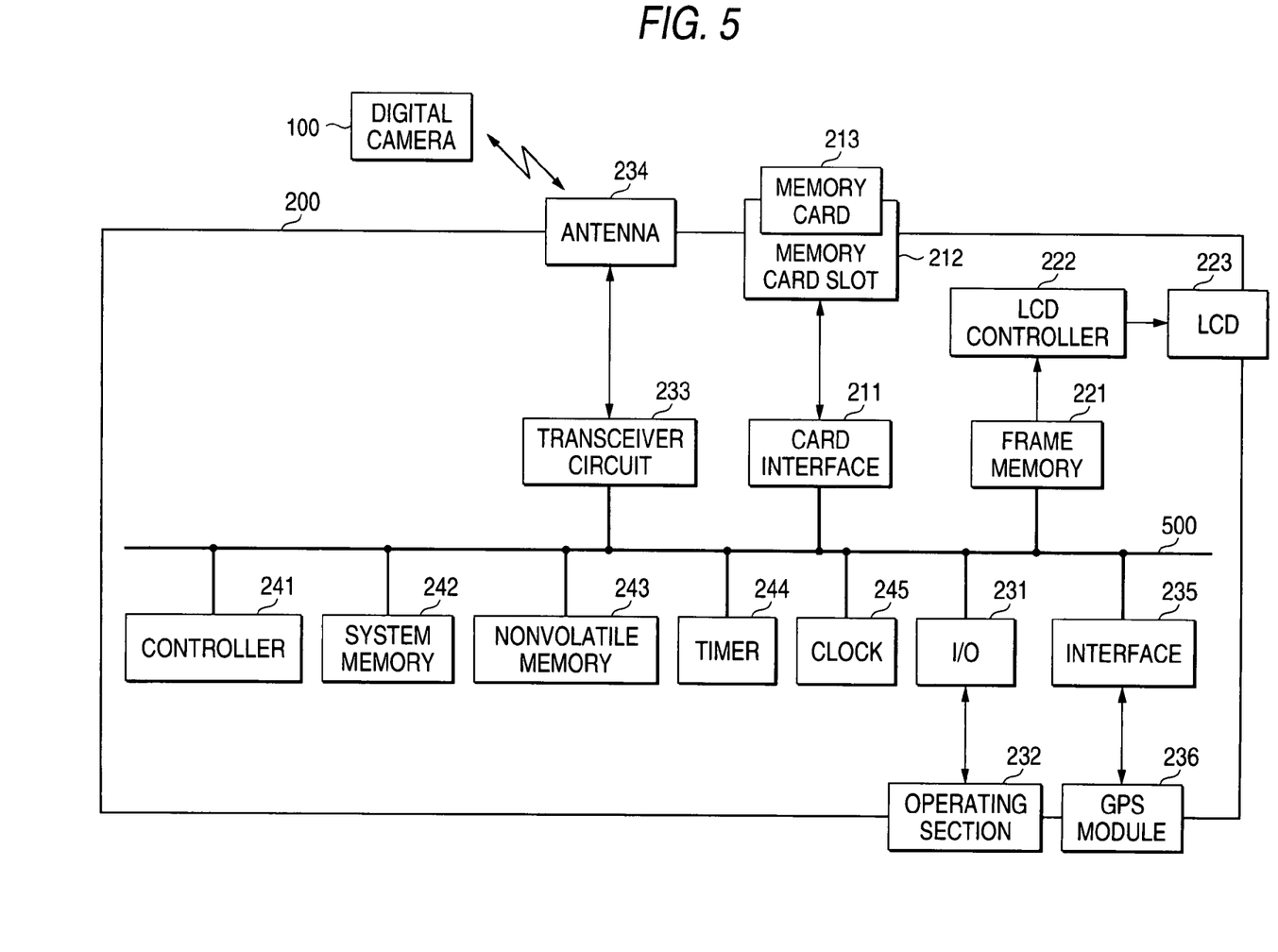
FIG. 5 shows an exemplary general configuration of a shooting system according to the embodiment of the invention.

FIG. 5 shows an exemplary general configuration of a shooting system which modifies imaging information by using a PDA. A PDA 200 in FIG. 5 has a controller 242 for controlling the operation of the entire PDA 200, a system memory 242, a nonvolatile memory 243, a timer 244, a clock 245, an input/output interface 231, an operating section 232, a transceiver circuit 233, an antenna 234, a GPS interface 235, a GPS module 236, a card interface 211, a memory card slot 212, a memory card 213, a frame memory 221, an LCD controller 222, an LCD 223, and a system bus 500.

The controller constituted by a processor controls the operation of the PDA 200 in accordance with various programs. The PDA 200 is equipped with the transceiver circuit 233 and the antenna 234 so as to allow communications with the digital camera 100. The PDA 200 has a well-known structure except that a GPS module is provided, so that details of the functions are not described.

The PDA displays the imaging information received from the digital camera 100 via short-range radio communications and awaits modification of the imaging information. Modification of imaging information is made by operation on the operating section 232. The modified imaging information is sent to the digital camera 100. In the case that longitude and latitude information is added to the imaging information, the longitude and latitude information acquired by using the GPS module 236 is added to the imaging information. Transmission of the modified information from the PDA 200 to the digital camera 100 is made by way of a transmission instruction by the operating section 232 of the PDA 200. In case a transmission instruction is not detected for a predetermined time after reception of imaging information, the imaging information may be automatically sent.

Figure 6:
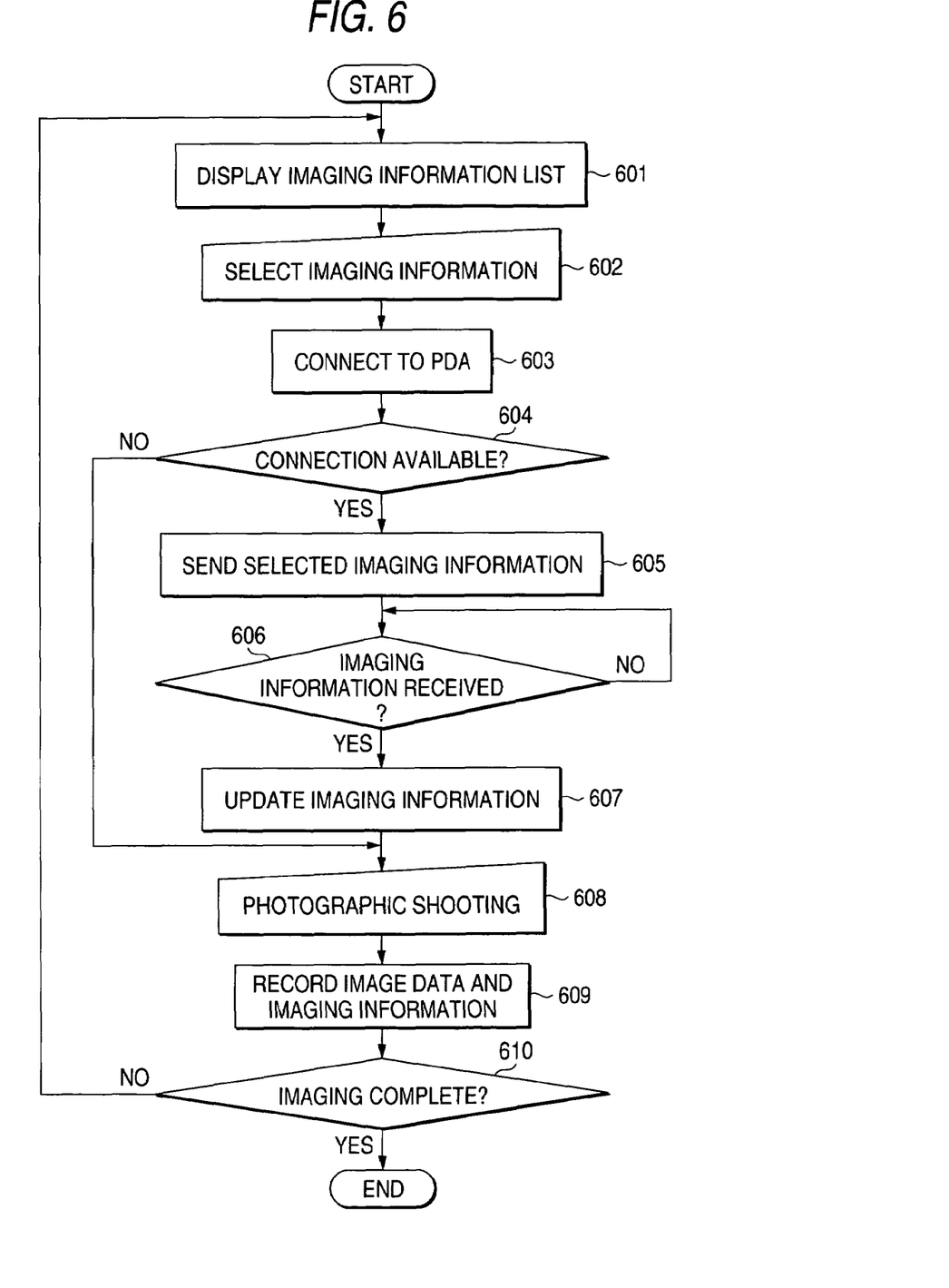
FIG. 6 shows a general flow of imaging operation of the digital camera in the imaging information record mode.
Figure 7:
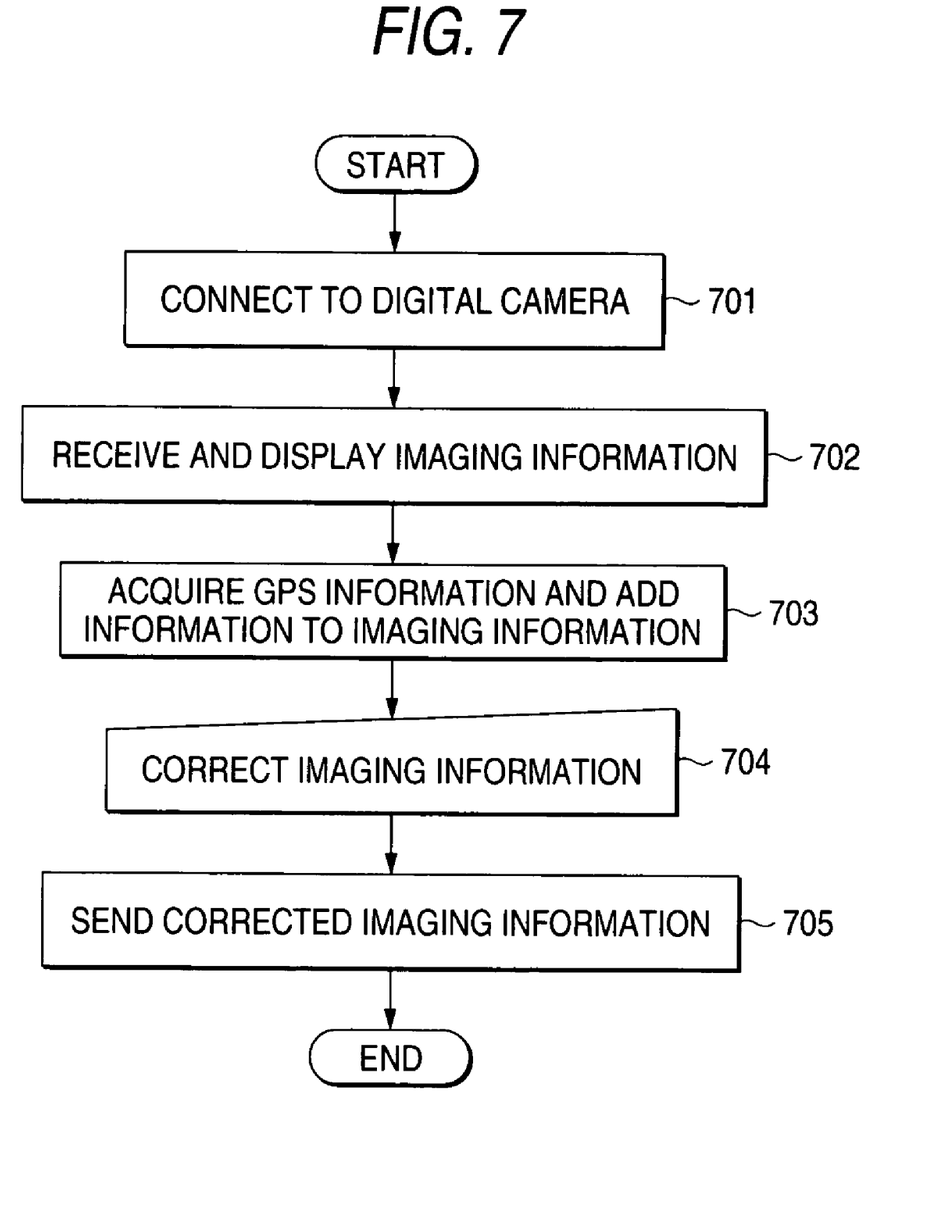
FIG. 7 shows a general operation flow of the PDA in the imaging information record mode.

Next, imaging operation using the imaging system in FIG. 5 in the imaging information recording mode will be described. FIG. 6 shows a general flow of imaging operation of the digital camera 100. FIG. 7 shows a general operation flow of the PDA 200.

Assume that imaging information shown in FIG. 3 is input to the digital camera 100 via the memory card 19. When the digital camera 100 is set to the imaging information record mode, a list of imaging information recorded in step 601 is displayed. Listing of imaging information does not need to cover all items of an imaging information but may include at least a imaging scene and other items may be omitted.

When the user selects imaging information (a shooting scene) in step 602, an attempt is made to connect to the PDA 200 in step 603. Whether connection of the digital camera 100 to the PDA 200 is available or not is determined in step 604. In the case connection is available, the imaging information selected in step 605 is sent to the PDA 200. The digital camera 100 awaits imaging information sent from the PDA 200 in step 606. After receiving imaging information from the PDA 200, the digital camera updates the imaging information in step 607.

Even in the case connection to the PDA 200 is unavailable in step 604, imaging itself is available. When an image is picked up in step 608, the digital camera 100 records the picked up image data and the imaging information in step 609. The digital camera 100 determines whether imaging is complete or not. In the case imaging is not complete, the execution returns to step 601 and repeats the same process.

Figure 8:
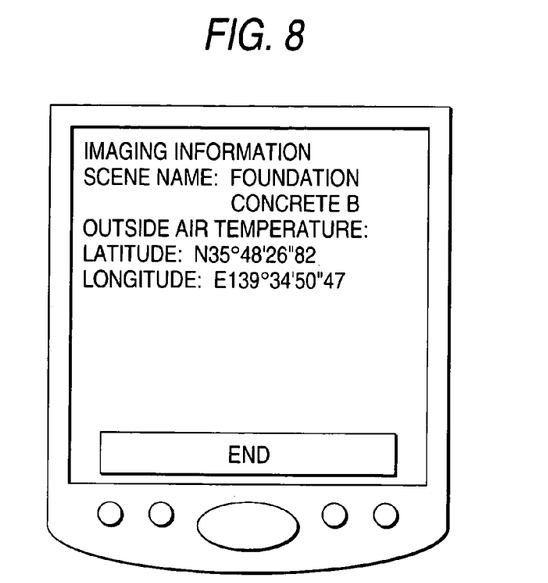
FIG. 8 shows a display example of the PDA.

When the PDA 200 receives a connection request from a digital camera 100, the PDA 200 performs connection process in step 701. When the connection is established, the PDA 200 receives imaging information and displays the received imaging information in step 702. The PDA 200 then acquires GPS information and adds the acquired information to the received imaging information in step 703. FIG. 8 shows a display example of the PDA 200 assumed when the PDA 200 received the imaging information of the scene name "Foundation concrete B" in the imaging information list file shown in FIG. 3 and added GOS information.

Next, the PDA 200 corrects the imaging information in step 704, and sends the corrected imaging information to the digital camera 100 to end the process in step 705.

Figure 9:
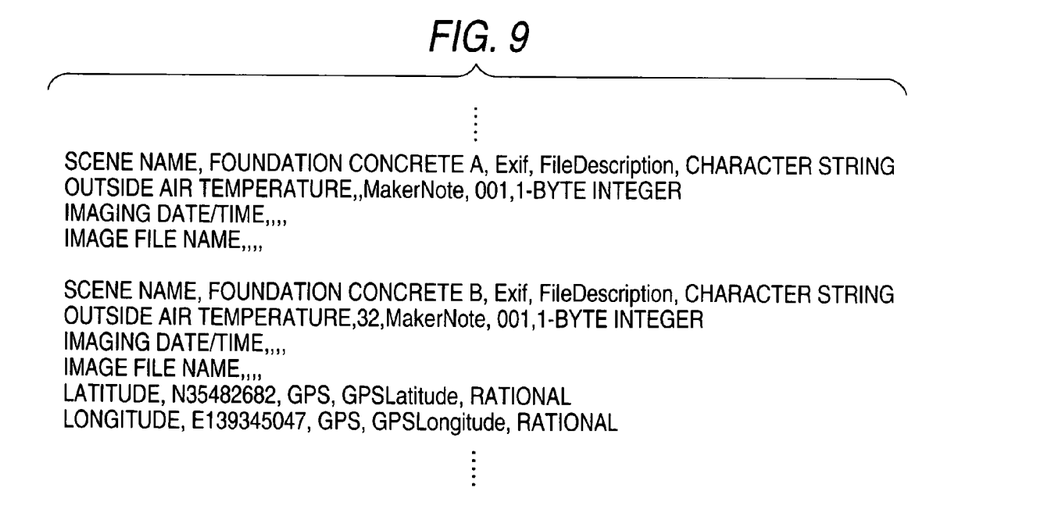
FIG. 9 shows part of a corrected imaging information list file.
Figure 10:
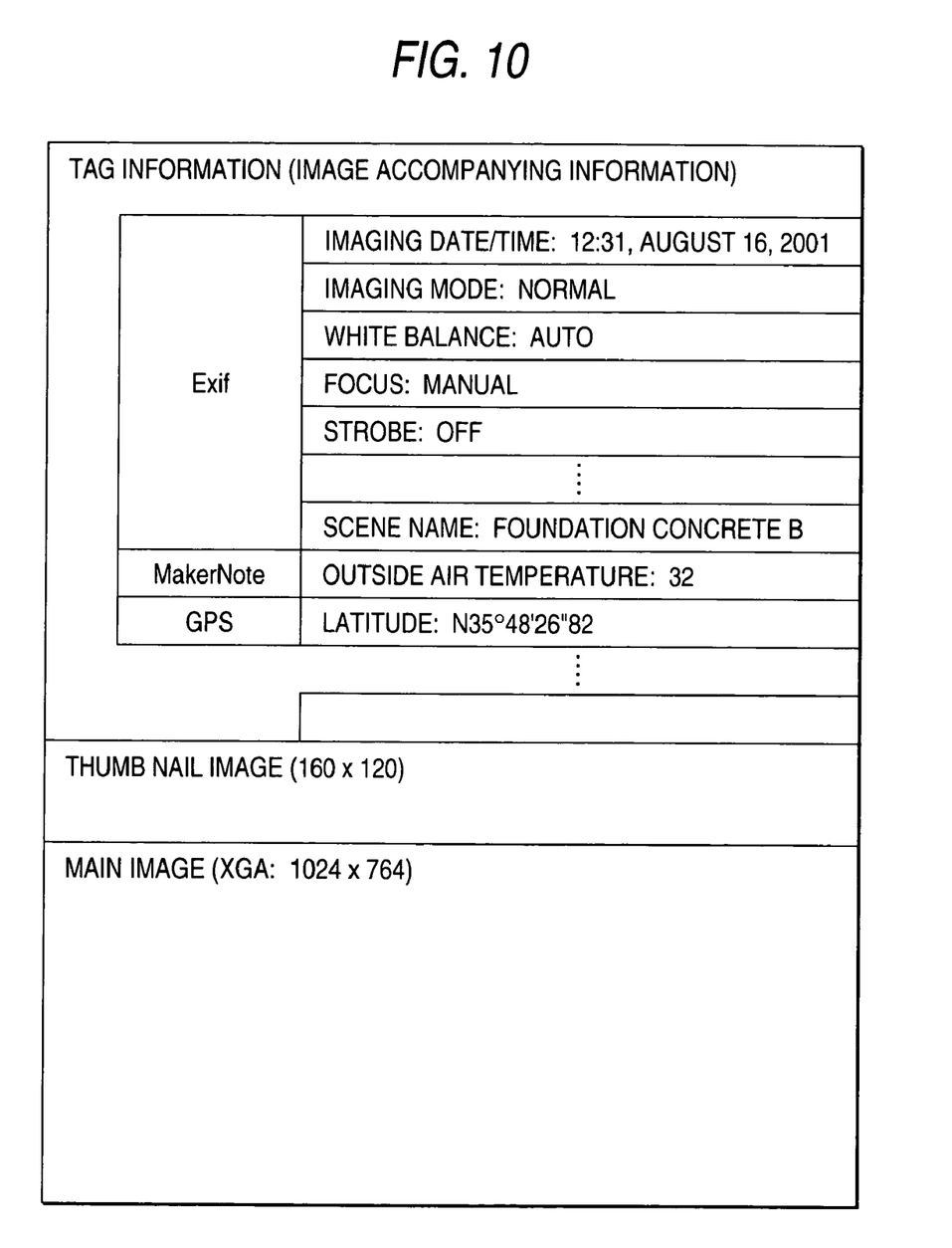
FIG. 10 shows an exemplary format of an image file where imaging information is added as property information.

FIG. 9 shows an example of updated imaging information in the digital camera 100. In this example, longitude and latitude information based on GPS information are added to the imaging information of the scene name "Foundation concrete B" and an outside air temperature is manually input. FIG. 10 shows the format of an image file that the imaging information of the update scene name "Foundation concrete B" is added as property information.

As explained the above, it is possible to easily correct and add imaging information recorded as property information of image data.

What is claimed is:

1. A digital camera, which records imaging information including information on a target to be picked up in association with image data under an imaging information record mode, comprising:
   an imaging information storage section for storing said imaging information;
   a communications section for communicating with an external portable terminal via wired or wireless communications;
   an imaging controller for performing imaging control including imaging control in said imaging information record mode; and
   an imaging information management section for managing said imaging information,
   wherein in response to a user selection of imaging information from an imaging information list said imaging information management section, in said imaging information record mode, sends said selected imaging information from the imaging information stored in said imaging information storage section to said external portable terminal via said communications section, and updates said selected imaging information in said imaging information storage section when receiving corrected selected imaging information from said external portable terminal after said selected imaging information is sent to said external portable terminal, and
   wherein, when said digital camera images a target to obtain image data of said target in said imaging information record mode, said imaging controller reads said selected imaging information from said imaging information storage section and stores the read imaging information in association wit the obtained image data.

2. A digital camera according to claim 1, wherein said imaging information is recorded as property information of an image file including said image data.

3. A digital camera according to claim 1, wherein said imaging information comprises at least one of a scene name of said target, outside air temperature at an imaging site, an imaging date, an imaging time, an image file name, and longitude and latitude information of the imaging site.

4. A digital camera according to claim 1, wherein said imaging information comprises a scene name of said target, outside air temperature at an imaging site, an imaging date, an imaging time, an image file name, and longitude and latitude information of the imaging site.

5. A digital camera according to claim 1, wherein at least a portion of the imaging information is generated externally to the camera and previously stored on the digital camera prior to picking up said image data.

6. A digital camera according to claim 5, wherein another portion of the imaging information is at least one of generated by said camera and manually input by said user at a time when said image data is picked up.

7. A digital camera according to claim 1, further comprising:
   a display section,
   wherein in the imaging information record mode, the imaging information management section displays the imaging information List on the display section to allow a user to select the imaging information from the imaging information list.

8. A digital camera according to claim 7, further comprising:
a switch for setting said digital camera to said imaging information record mode.

9. A digital camera according to claim 8, wherein when said digital camera is set to said imaging information record mode by operation of said switch, said imaging controller refers to said imaging information stored in said imaging information storage section and causes said display section to display a target list.

10. A digital camera according to claim 1, wherein said image data comprises data for generating an image of said target, and said imaging information comprises information for identifying said target.

11. A digital camera according to claim 1, wherein said external portable terminal comprises a global positioning system (GPS), and said updated imaging information comprises GPS information which is added to said imaging information sent by said imaging information management section to said external portable terminal.

12. A imaging system, comprising:
a digital camera, which records imaging information including information on a target to be picked up in association with image data under an imaging information record mode, and
a portable terminal,
wherein said digital camera comprises:
an imaging information storage section for storing said imaging information;
a communications section for communicating with an external portable terminal via wired or wireless communications;
an imaging controller for performing imaging control including imaging control in said imaging information record mode; and
an imaging information management section for managing said imaging information,
wherein in response to a user selection of imaging information from an imaging information list, said imaging information management section, in said imaging information record mode, sends said selected imaging information from the imaging information stored in said imaging information storage section to said external portable terminal via said communications section, and updates said selected imaging information in said imaging information storage section when receiving corrected selected imaging information from said external portable terminal after said selected imaging information is sent to said external portable terminal,
wherein when said digital camera images a target to obtain image data of said target in said imaging information record mode, said imaging controller reads said selected imaging information from said imaging information storage section and stores the read imaging information in association with the obtained image data,
wherein the portable terminal, which is connected via said communications section, including a display section, an operating section and an imaging information modification controller, and
wherein said imaging information modification controller displays the imaging information received from said digital camera onto said display section and sends said imaging information which is undergone a correction to said digital camera, said correction includes a correction implemented by way of operation on said operating section.

13. A imaging system according to claim 12, wherein said imaging information is recorded as property information of an image file including said image data.

14. An imaging system according to claim 12, wherein said digital camera further comprises a display section, and
wherein in the imaging information record mode, the imaging information management section displays the imaging information list on the display section of said digital camera to allow a user to select the imaging information from the imaging information list.

15. A method of modifying imaging information which includes information on a target to be picked up in association wit image data by a digital camera under an imaging information record mode, comprising:
storing said imaging information in an imaging information storage section of said digital camera;
communicating, by said digital camera, with an external portable terminal via at least one of wired and wireless communications;
performing, by said digital camera, imaging control including imaging control in said imaging information record mode; and
managing, by said digital camera, said imaging information,
wherein said managing said imaging information comprises at least one of correcting said imaging information and adding new imaging information,
wherein said at least one of correcting said imaging information and said adding said new imaging information of said digital camera, comprises:
selecting at least a portion of said imaging information from an imaging information list which lists the imaging information stored in said imaging information storage section;
in response to said selection of said at least a portion of said imaging information, sending said at least a portion of said imaging information to said external portable terminal via said communicating;
receiving updated selected imaging information, which corresponds to said selected at least a portion of said imaging information, from said external portable terminal after said selected imaging information is sent to said external portable terminal; and
storing said updated imaging information in said imaging information storage section of said digital camera, and
wherein when said digital camera images a target to obtain image data of said target in said imaging information record mode, said selected imaging information is read from said imaging information storage section and the read imaging information is stored in association with the obtained image data.

16. A method according to claim 15, further comprising:
reading said imaging information, including said updated imaging information, from said imaging information storage section; and
storing said imaging information, including said updated imaging information, in association with said image data in recording image data.

17. A method according to claim 15, wherein said imaging information comprises at least one of a scene name of said target, outside air temperature at an imaging site, an imaging date, an imaging time, an image file name, and longitude and latitude information of the imaging site.

18. A method according to claim 15, wherein said imaging information comprises:

a scene name of said target, outside air temperature at an imaging site, an imaging date, an imaging time, an image file name, and longitude and latitude information of the imaging site.

19. A method according to claim 15, wherein at least a portion of the imaging information is generated externally to the camera and previously stored on the digital camera prior to picking up said image data.

20. A method according to claim 15, wherein another portion of the imaging information is at least one of generated by said camera and manually input by said user at a time when said image data is picked up.

21. A method according to claim 15, further comprising:

displaying the imaging information list on a display section of said digital camera, wherein in the imaging information record mode, the imaging information management section displays the imaging information list on the display section to allow a user to select the imaging information from the imaging information list.

* * * * *